(12) United States Patent
Juranitch

(10) Patent No.: US 12,233,365 B2
(45) Date of Patent: Feb. 25, 2025

(54) TAILING POND REMEDIATION

(71) Applicant: HEAT IP HOLDCO, LLC, Aberdeen (GB)

(72) Inventor: James Charles Juranitch, Fort Lauderdale, FL (US)

(73) Assignee: HEAT IP HOLDCO, LLC, Aberdeen (GB)

( * ) Notice: Subject to any disclaimer, the term of this patent is extended or adjusted under 35 U.S.C. 154(b) by 0 days.

(21) Appl. No.: 17/383,523

(22) Filed: Jul. 23, 2021

(65) Prior Publication Data

US 2022/0111319 A1  Apr. 14, 2022

Related U.S. Application Data

(63) Continuation of application No. 16/105,547, filed on Aug. 20, 2018, now Pat. No. 11,097,212.
(Continued)

(51) Int. Cl.
*B01D 39/06* (2006.01)
*B01D 21/00* (2006.01)
(Continued)

(52) U.S. Cl.
CPC ......... *B01D 39/06* (2013.01); *B01D 21/0012* (2013.01); *B01D 37/03* (2013.01);
(Continued)

(58) Field of Classification Search
CPC .... B01D 21/0012; B01D 37/03; B01D 39/06; B01D 39/10; B01D 41/04; B01D 2221/04; B01D 2239/0283; B01D 2257/93; B01D 2239/0407; B01D 2239/10; B01D 29/01; B01D 29/05; B01D 29/09; B01D 29/096; B01D 29/56; B01D 33/00; B01D 33/04; B01D 33/042; B01D 33/044; B01D 33/048; B01D 33/056; B01D 33/41;
(Continued)

(56) References Cited

U.S. PATENT DOCUMENTS 3,347,378 A * 10/1967 Arnold ................. B01D 29/096
                                                          210/111
3,833,468 A    9/1974 Boniface
(Continued)

FOREIGN PATENT DOCUMENTS

GB    2014866 A  * 2/1979 ............ B01D 33/04
JP    2000061224 A * 2/2000 ............ B01D 39/16
(Continued)

OTHER PUBLICATIONS

English translation of Tamura et al patent publication JP 2000061224A, published Feb. 29, 2000. (Year: 2000).*
(Continued)

*Primary Examiner* — Joseph W Drodge
(74) *Attorney, Agent, or Firm* — LAW OFFICE OF JESSE D. LAMBERT, LLC

(57) ABSTRACT

Various embodiments of the present disclosure can include a system for filtering of contaminated fluid. The system can include a fiber manufacturing plant. The system can include a filter system which utilizes a fiber filter produced in the fiber manufacturing plant to clean and recycle a contaminated fluid.

20 Claims, 7 Drawing Sheets

Related U.S. Application Data

(60) Provisional application No. 62/548,288, filed on Aug. 21, 2017.

(51) Int. Cl.
  *B01D 37/03* (2006.01)
  *B01D 39/10* (2006.01)
  *B01D 41/04* (2006.01)
  *C03B 37/10* (2006.01)
  *C03B 37/16* (2006.01)

(52) U.S. Cl.
  CPC ............. *B01D 39/10* (2013.01); *B01D 41/04* (2013.01); *C03B 37/10* (2013.01); *C03B 37/16* (2013.01); *B01D 2221/04* (2013.01); *B01D 2239/0283* (2013.01); *B01D 2239/0407* (2013.01); *B01D 2239/10* (2013.01); *B01D 2257/93* (2013.01)

(58) Field of Classification Search
  CPC ...... B01D 33/803; B01D 39/02; D21H 11/16; D21H 13/36; D21H 13/38; D21H 13/40; B29B 17/02; B29B 17/04; B29B 2017/0089; B29C 73/00; B29C 73/26; D06C 19/00; D06C 7/00; C03B 37/10; C03B 37/16; C03B 5/00; C03B 5/005; C03B 37/00; C03B 37/01; C03B 37/011; C03B 37/022; C03B 37/12
  USPC ........ 210/505, 508, 509; 264/5, 36.1, 36.11, 264/36.15, 36.22, 37.1, 37.28, 913
  See application file for complete search history.

(56) References Cited

U.S. PATENT DOCUMENTS

| | | | |
|---|---|---|---|
| 3,887,344 A | 6/1975 | Smith | |
| 4,251,237 A | 2/1981 | Smith | |
| 4,346,003 A * | 8/1982 | Polyakov | B01D 11/0219 100/109 |
| 4,383,925 A | 5/1983 | Hilscher et al. | |
| 4,686,043 A | 8/1987 | Yagishita et al. | |
| 5,229,012 A * | 7/1993 | Pall | A61M 1/3679 210/508 |
| 5,372,653 A | 12/1994 | Gray | |
| 5,415,697 A | 5/1995 | MacDonald et al. | |
| 5,466,271 A | 11/1995 | Horvat | |
| 5,620,596 A | 4/1997 | Engdahl et al. | |
| 5,795,285 A * | 8/1998 | McLaughlin | C03B 5/005 588/407 |
| 7,008,465 B2 | 3/2006 | Graham et al. | |
| 11,097,212 B2 * | 8/2021 | Juranitch | B01D 21/0012 |
| 2008/0023015 A1 | 1/2008 | Arnold et al. | |
| 2009/0044570 A1 * | 2/2009 | Yang | B09B 3/29 65/488 |
| 2011/0089122 A1 * | 4/2011 | Smith | B01D 33/056 210/774 |
| 2011/0242772 A1 | 10/2011 | Singleton | |
| 2012/0241385 A1 | 9/2012 | McCarthy et al. | |
| 2012/0251597 A1 | 10/2012 | Gupta et al. | |
| 2013/0097942 A1 | 4/2013 | Morano et al. | |
| 2013/0126448 A1 | 5/2013 | McCabe et al. | |
| 2015/0157965 A1 * | 6/2015 | Strain | B01D 33/64 210/104 |
| 2016/0045841 A1 | 2/2016 | Kaplan et al. | |
| 2018/0022629 A1 | 1/2018 | Demott et al. | |

FOREIGN PATENT DOCUMENTS

| | | | |
|---|---|---|---|
| JP | 2011517619 A * | 6/2011 | ............. B01D 33/04 |
| WO | 2017087989 A1 | 5/2017 | |
| WO | 2017136571 A1 | 8/2017 | |

OTHER PUBLICATIONS

"IPPC" Integrated Pollution Prevention and Control, Reference Document on Best Available Techniques in the Glass Manufacturing Industry, Dec. 2001. (Year: 2001).

Feasibility Study for Remedial Action at the Chemical Plant Area of the Weldon Spring Site, vol. I, Main Text, Nov. 1992. (Year: 1992).

* cited by examiner

TAILING POND REMEDIATION

CROSS-REFERENCE TO RELATED APPLICATIONS

This application is a continuation of U.S. application Ser. No. 16/105,547, filed 20 Aug. 2018 (the '547 application), which claims the benefit of United States provisional application No. 62/548,288, filed 21 Aug. 2017 (the '288 application). The '547 application, and '288 application are both hereby incorporated by reference as though fully set forth herein

FIELD OF THE INVENTION

Embodiments of the present disclosure relate generally to a method, apparatus and system for the remediation and potential elimination of tailing ponds that can result from surface mining of natural resources such as bitumen or unconventional oil.

BACKGROUND

The surface mining hydrocarbon recovery process in locations such as the oil sands of Alberta Canada has proven to be an effective way of recovering fossil energy, however, the process is not without negative issues. One of the undesirable traits is a larger disposal requirement of a tailing solution that is the result of the bitumen separation process from the mined ore. The most widely used surface mined bitumen separation process is the Clark Hot Water Extraction Process. That process produces approximately 5 to 12 barrels of waste fluid for every barrel of oil equivalent derived from the bitumen ore. The majority of this fluid is deposited in tailing ponds and is to some level toxic. The ponds quickly settle out the sands and heavy debris allowing for 7 barrels of recoverable fluid per 12 barrels of waste fluid produced for every barrel of oil equivalent. This recovered fluid can be re-used in the bitumen separation process in a reasonable amount of time. Unfortunately, the balance of the fluid is contaminated with "fines" which are made up of clay and other particles that are generally below 44 microns in size. These particles for numerous reasons can stay in suspension for up to thousands of years making these ponds an extreme ecological liability. Many filtering methods have been tried to recover the balance of the recyclable fluids from the ponds. The filtering methods include many forms such as; centrifuges, conventional filters, chemically augmented filters using flocculants and coagulants, crystallizers, and evaporators.

Filtering systems have been to date rendered ineffective due to many reasons including; the high cost of chemical additives needed to supplement a conventional filtering process; the phenomena of poor hydraulic permeability of the suspended clays which quickly jam a conventional filter; and/or the high cost of conventional filters and their short production life. Evaporation techniques cannot service effectively the large volume of fluid that needs to be treated. Centrifuges can work but have proven to be a high maintenance and expensive process. Crystallizers in this application typically fail due to contamination issues and cost. A better, more robust and cost-effective system, is needed to help reduce the ecological damage inflicted by the continued growth of the tailings ponds in most mining activities including bitumen ore.

BRIEF SUMMARY

Various embodiments of the present disclosure include a system for the filtering of contaminated fluid. The system can include a fiber manufacturing plant. The system can include a filter system which utilizes a fiber filter produced in the fiber manufacturing plant to clean and recycle a contaminated fluid.

Various embodiments of the present disclosure include a system for the filtering of contaminated fluid. The system can include a fiber manufacturing plant. The system can include a filter system which utilizes a pre-filter screen which is movable and self-cleaning and a fiber filter produced in the fiber manufacturing plant to clean and recycle a contaminated waste fluid.

Various embodiments of the present disclosure include a system for the filtering of contaminated fluid. The system can include a plasma melter based fiber manufacturing plant. The system can include a filter system which utilizes a fiber filter produced in the plasma melter based manufacturing plant to clean and recycle a contaminated waste fluid.

Various embodiments of the present disclosure include a system for the filtering of contaminated fluid. The system can include a plasma and fossil fuel melter based fiber manufacturing plant. The system can include a filter system which utilizes a fiber filter produced in the plasma and fossil fuel melter based fiber manufacturing plant to clean and recycle a contaminated waste fluid.

DETAILED DESCRIPTION

Embodiments of the present disclosure relate generally to a method, apparatus and system for the remediation and potential elimination of tailing ponds that can result from surface mining of natural resources such as bitumen or unconventional oil.

Embodiments of the present disclosure relate generally to a method, apparatus and system for the remediation and potential elimination of tailing ponds that result in many cases from surface mining of natural resources such as bitumen or unconventional oil. In all cases of this disclosure, the tailing pond contaminated fluid is filtered through a fiber filter. The fiber filter is produced from an inorganic such as melted beach sand. The sand is a by-product of the Clark Hot Water Extraction Process (CHWP) and typically is extracted from the tailing ponds. Other chemical additives such as lime sludge which are also a byproduct of bitumen extraction can be added to the inorganic to promote fiber production. Fiber production is established to produce a low cost and continuous filter element for the method, apparatus and system disclosed. The contaminated fluid is filtered through the produced fiber filter element, which is then deposited or shredded and deposited into a structurally stable land fill. Additional chemical additives such as surfactants, coagulants and flocculants can be added to tailings fluid to help promote filtering efficiency. Chemical additions, although possible, are preferably minimized due to their added operating expense and negative effect on the fluid's recycled performance. The disclosed process minimizes the need for additional chemicals due to its continuous, disposable, and effective filtering process. The disposable filter also becomes a 3 dimensional media used to stabilize the filtered mining byproducts for final disposition into a land fill.

Figure 1:
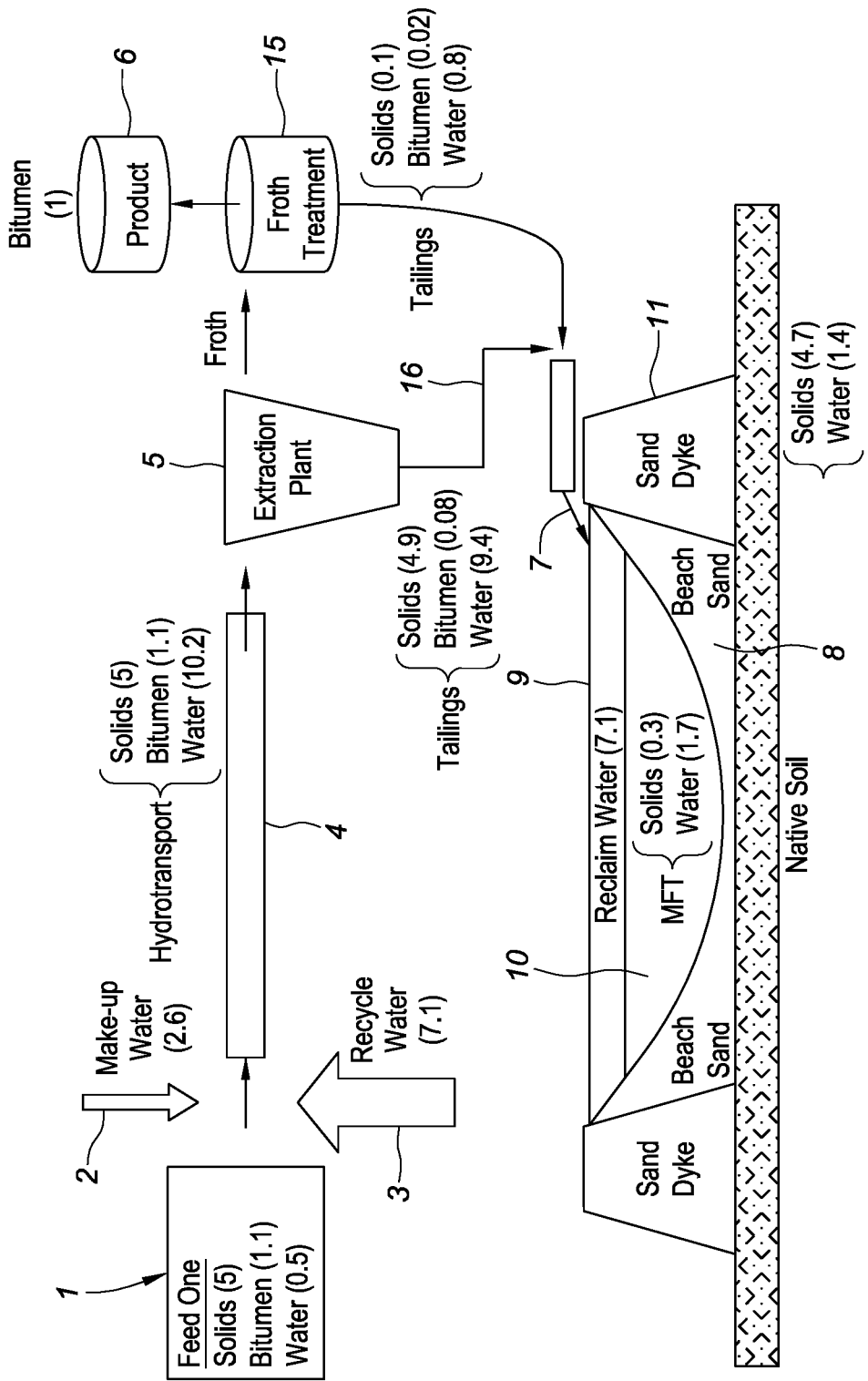
FIG. 1 depicts a typical bitumen mining and separation process including tailing ponds, in accordance with embodiments of the present disclosure.

FIG. 1 shows the process and volume flow of a typical bitumen extraction process in locations such as the Alberta Oil Sands and the resulting tailings pond from the extraction process. This process is generically referred to as the Clark Hot Water Extraction Process (CHWP).

Input stream 1 can include feed ore mined from the ground. It typically can contain 5 barrels (bbl) of solids, 1.1 bbl of bitumen and 0.5 bbl of water. However, the ratios of solids to bitumen to water are given for example only and can be varied. Makeup water stream 2 in a typical bitumen extraction process can include 2.6 bbl of additional fresh makeup water. As depicted, the makeup water from the makeup water stream 2 can be added in addition to recycled water from recycle stream 3. As further depicted, 7.1 bbl of recycled pond water is added to the makeup water. This slurry is then transported down a pipe (e.g., hydrotransport) to an extraction plant 5. The transportation of the slurry from a mine location to an extraction plant helps to start the bitumen separation process. In an example, the slurry can include 5 bbl of solids, 1.1 bbl of bitumen, and 10.2 bbl of water. In the extraction plant 5, heat, agitation and chemicals are added to further separate the bitumen from the balance of the ore. A froth is formed, which is separated from a fluid. The froth contains the desired bitumen product. The fluids contain the resultant unwanted clays, fines, sands and miscellaneous solids. The product froth continues through a further separation process, depicted as froth treatment 15, and a salable oil equivalent product is produced via the froth treatment and is stored in tank 6.

The waste fluid from the CHWP in conduit 16 can nominally be made up of 4.9 bbl of solids, 0.08 bbl of unrecovered bitumen and 9.4 bbl of contaminated waste fluid, in an example. The waste fluid is typically transferred onto dykes 11 where the heavy solids, such as sand, quickly precipitate out and are deposited in a mound of beach sand 8. Some re-usable or reclaimed water 9 (e.g., 7.1 bbl) in a reclaimed water zone quickly forms on top of the remaining tailings pond. The balance of the fluid can remain in a contaminated state of solids and fluid made up primarily of fine clays and water shown as contaminated material 10 (e.g., 0.3 bbl of solids and 1.7 bbl of water), which can stay in suspension for decades and potentially thousands of years.

Figure 2:
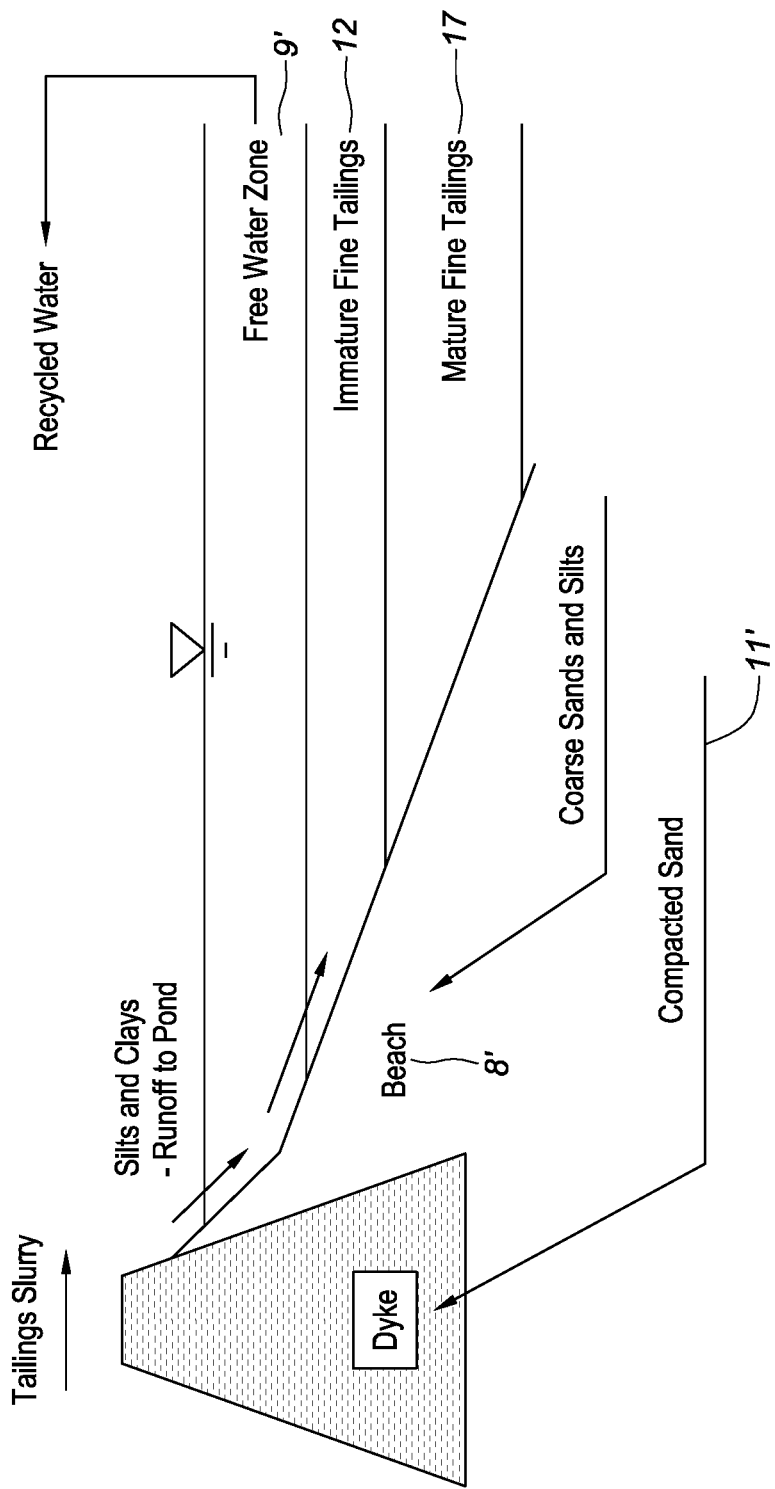
FIG. 2 depicts a cross section detail of a typical bitumen tailings pond, in accordance with embodiments of the present disclosure.

FIG. 2 shows a detail of a tailings pond, reclaimed fluid 9', and contaminated material made up of immature fine tailings 12 and mature fine tailings 17. The figures herein can depict elements that are the same or similar via use of a "prime" number. For example, the beach 8' depicted in FIG. 2 can be the same or similar to the beach 8" depicted in FIG. 3. The waste fluid is typically transferred onto dykes 11' where the heavy solids, such as sand, quickly precipitate out and are deposited in a mound of beach sand 8'. Contaminated material 10 depicted in FIG. 1 is more accurately made up of at least two components shown as immature fine tailings 12 and mature fine tailings (MFT) 17, as depicted in FIG. 2. The slurry made up of contaminated material 10 is desired to mature from the immature fine tailings 12 and MFT 17, shown in FIG. 2, into a final configuration of free water or reclaimed water 9' and MFT 17 only. As previously noted, this can take from decades to thousands of years. At the conclusion of this process, it is desired to remove the MFTs 17 and landfill them in a manner, which allows for an acceptable overburden load or compressibility. Unfortunately, for the MFTs 17 to become capable of carrying a load, it can take the extended times already noted. In the meantime, the tailing ponds must exist and in most cases grow into an ever larger environmental liability.

Figure 3:
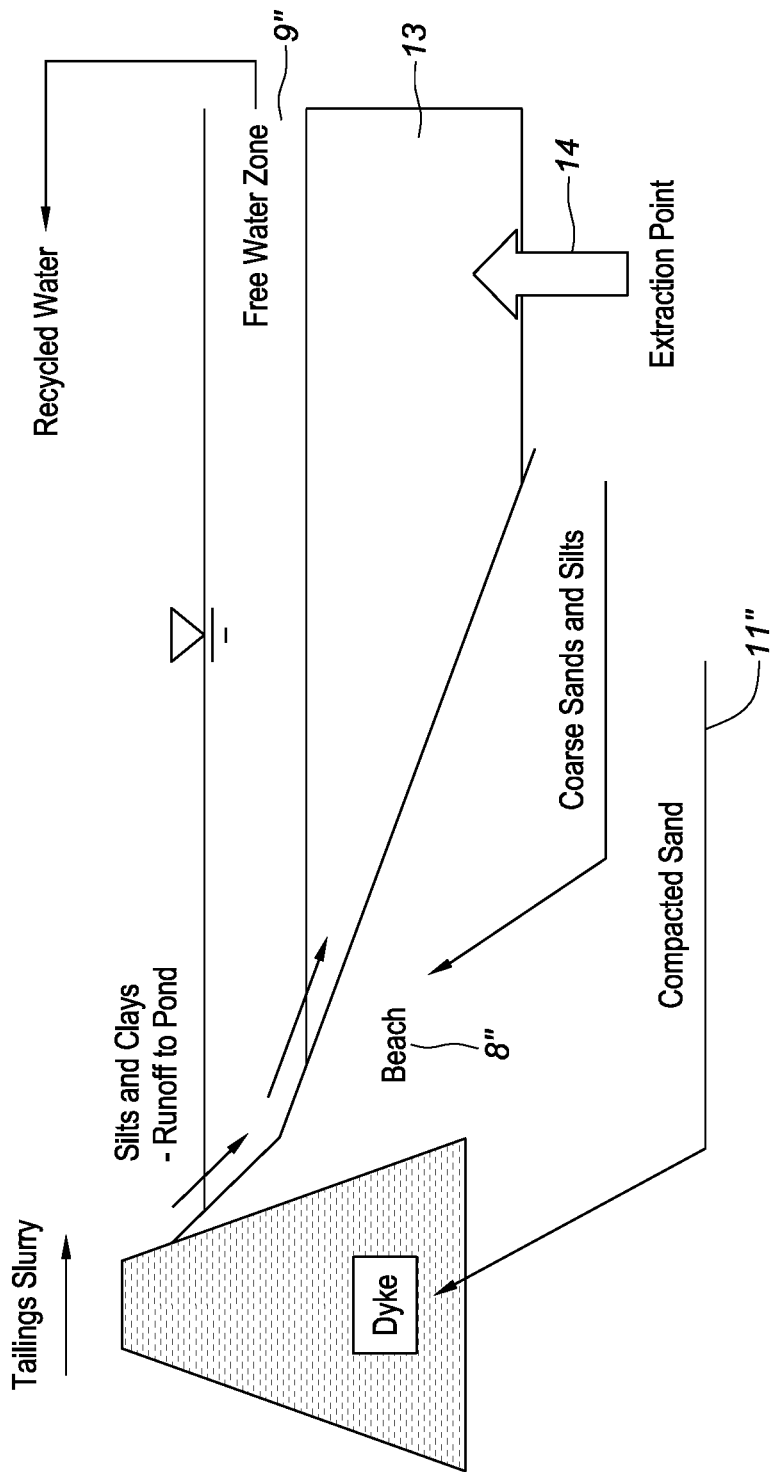
FIG. 3 depicts a second cross section detail of a bitumen tailings pond, in accordance with embodiments of the present disclosure.

FIG. 3 depicts how embodiments of the present disclosure relate generally to a method, apparatus and system for the remediation and potential elimination of tailing ponds that result in many cases from surface mining of natural resources, such as bitumen or unconventional oil. Immature fine tailings (IMF) 12 and MFT 17 (FIG. 2) in the disclosed method, apparatus and system are never allowed to separate out into the previously described zones.

Any fast-developing free water (e.g., reclaimed water 9") in the reclaimed water zone is extracted in a conduit (not shown) for recycling to the CHWP to reduce the filtering process requirements of the disclosed method, apparatus and system. A new zone, which is made up of fluids and fines shown as extraction zone 13 in FIG. 3 is tapped as an extraction point 14 through which fluid can be extracted from the extraction zone 13 and/or from the tailings pond. For example, the IMF 12 and MFT 17 are not allowed to separate out in an extraction zone 13. The extracted fluid can consequently provide a feedstock for the disclosed method, apparatus and system. A man made buffering pool can be substituted for a tailings pond and can be sized large enough for the heavy partials such as the beach sands to precipitate and later be utilized in the filter making process. Free water may or may not be available depending on the size of the buffer pool and consequently the available settling time. The pools could be lined with clay, plastic, concrete or any other viable isolation material. This much smaller buffering pool would eliminate the need for a tailings pond.

FIG. 4A shows the resulting fluid 13' from pond extraction point 14 (FIG. 3) being delivered to housing 17 which is a component of a fluid filtering station described by FIG. 4A. Additional chemical additives, such as surfactants, coagulants and flocculants can be added to tailings fluid 13' to help promote filtering efficiency. The effectiveness of prescreen 18 and filter material 20 (e.g., fiber filter blanket) promotes the minimization of any needed additional chemicals. For example, the prescreen 18 can be disposed over the filter material 20 and can catch larger diameter particles, while the filter material 20 can filter the particles that pass through the prescreen 18.

The prescreen 18 can be a pre-filter and can be formed from a mesh, which can be sized and configured for 40 to 400 microns of filtering capability and can be layered on top of the filter material 20. In some embodiments, the prescreen 18 can be sized and configured for approximately 100 to 200 microns of filtering capability. The filter material 20 can be produced by a vitrifying process. The heat to produce the vitrifying melt could be generated by any heat source such as a fossil fuel, which could be coal, natural gas, well head gas, propane, butane, or any other heat producing fuel, or by an alternative heat source such as electricity, which could be in the form of a plasma heat generator, or a combination of all the above. The fiber produced to form the filter material 20 is compressed by housing 17, imparting a force on prescreen 18, which then imparts a resultant force and compression on the filter material 20. In some embodiments, the prescreen 18 can be formed from a rigid and/or semi-rigid material, such as a metal and/or plastic. Fluid 13' can be pressurized to force the contaminated fluid through prescreen 18 and finally through filter material 20. The pressure, flow, or both pressure and flow, of the fluid 13' in housing 17 can be monitored against limits to end the filter process. For example, if the pressure increases to a defined limit and/or the flow decreases to a defined limit, the process can be stopped. The filter process may be able to cycle a number of times without replacing the filter fiber by advancing the prescreen 18 off of feed roll 19 past scraper 26 to extract the contaminant 27 into a catch basin (not shown). Air blow off 29 may be optionally added in addition to or in place of the scraper 26 to assist in the extraction process. The pre-filter can be taken up and stored on spool 25. In an example, when the filter process cycles, the housing 17 can be retracted, as further depicted and described in relation to FIG. 5.

Support 28A can be a foundation or back support for the filter material 20 and can be manufactured many different ways. In an example, the support 28A can be a large mesh screen or it can be configured as a bar support arrangement, for example a bar support 28B, as shown in FIG. 4B. FIG. 4B depicts a top view of the bar support 28B. For example, the bar support 28B can include an outer frame 31 that houses a plurality of bars (e.g., bar 35) that extend across and/or are mounted to the outer frame 31. Housing support 22 can be disposed below the filter material 20, the prescreen 18, and the support 28A. In some embodiments, a vacuum can be created in the housing support 22 to help draw fluid through the prescreen 18 and the filter material 20, into the housing support 22. In some embodiments, the housing support 22 can be kept at atmospheric conditions or even above atmospheric conditions. As the delta pressure between fluid 13 and housing support 22 is increased, the produced filter flow volume can be increased. Filtered fluid 23 to be returned to the CHWP can pass from the housing support 22 through a conduit (e.g., filtered fluid conduit) formed in the housing support 22. Overflow or "House Keeping Fluid" is extracted at conduit 30 and returned to flow 13'.

Figure 4:
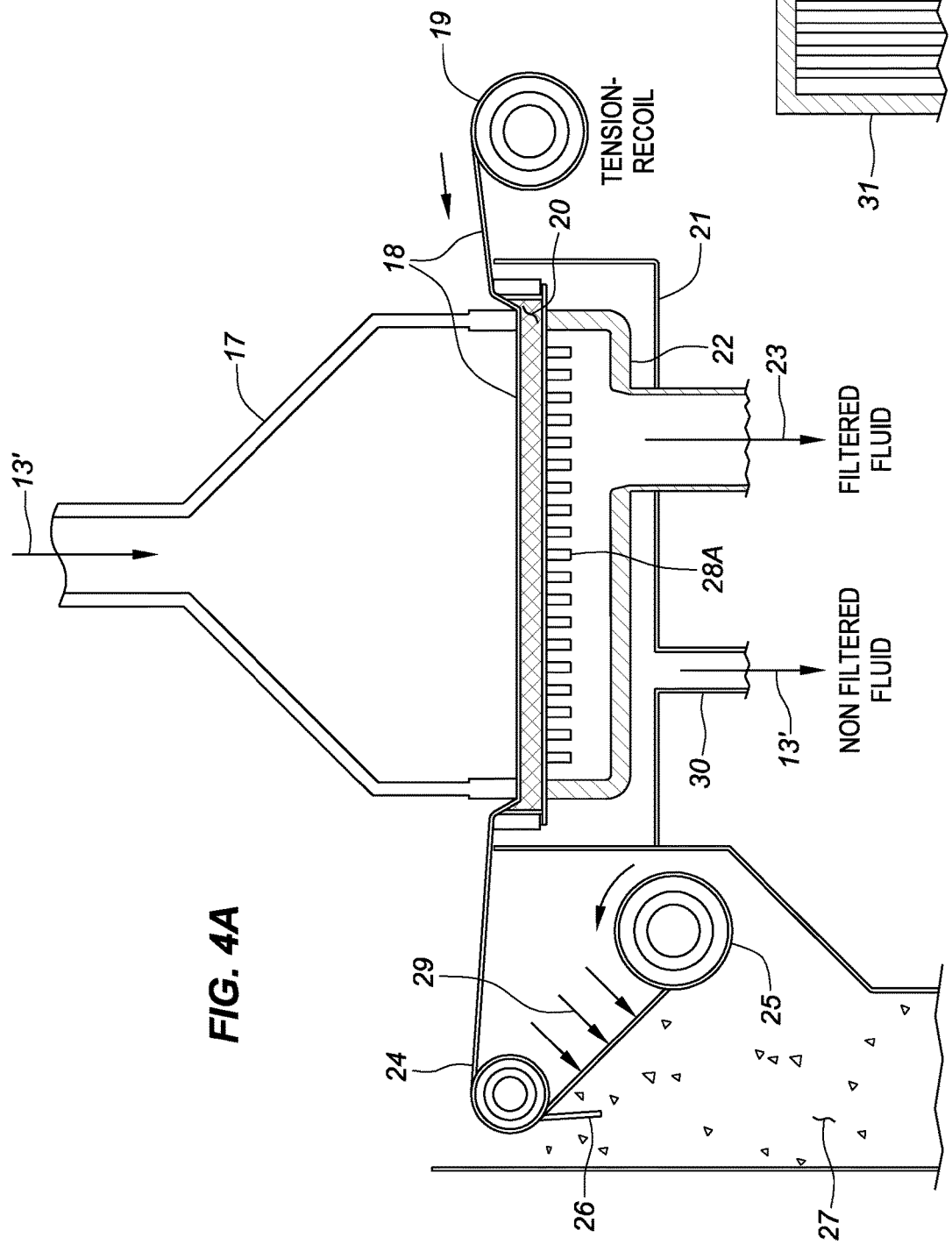
FIGS. 4A and 4B depict a representation of a filter system, method, and apparatus that is in accordance with embodiments of the present disclosure in a closed or pressurized condition.
Figure 5:
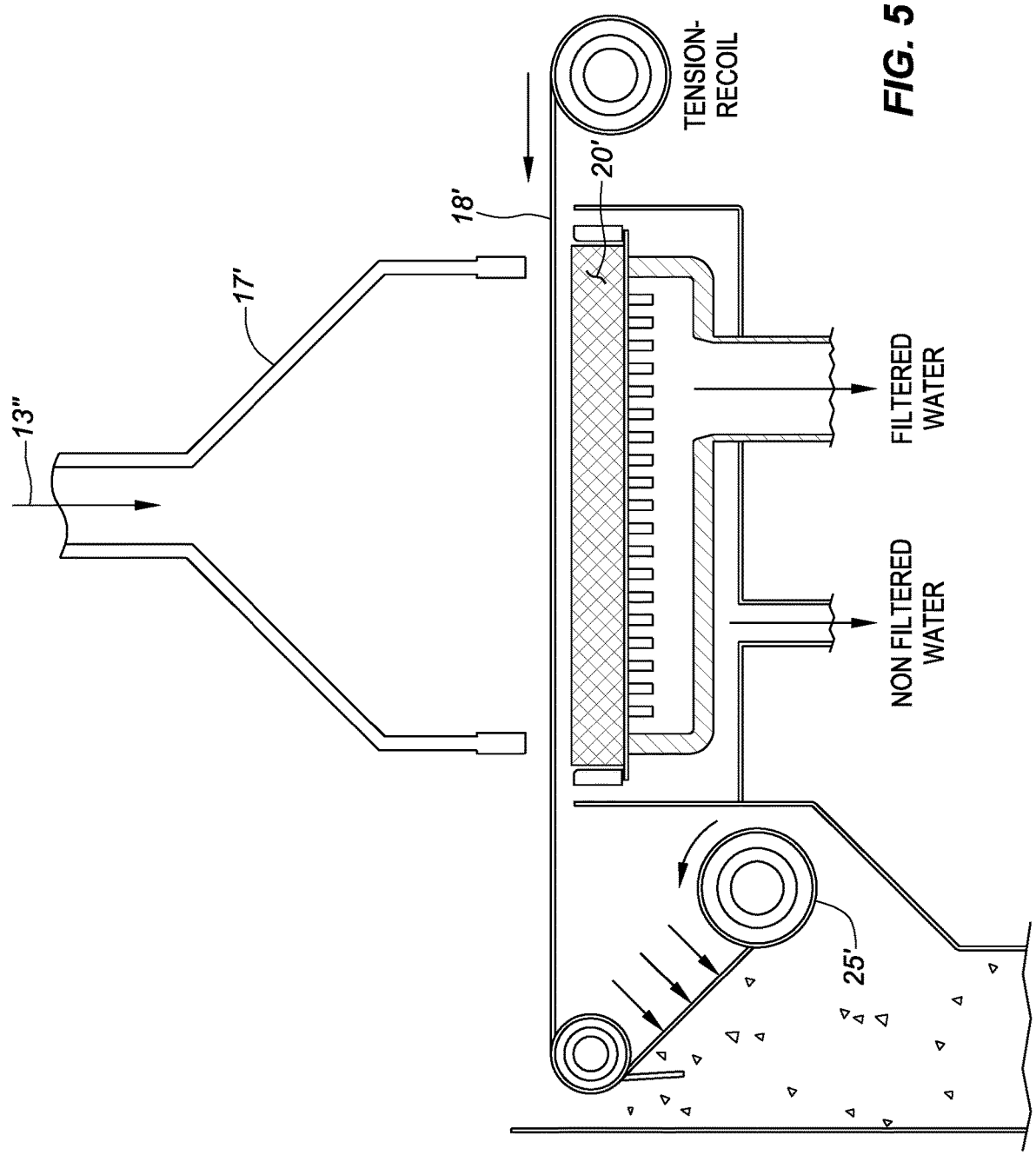
FIG. 5 depicts a representation of a filter system, method, and apparatus that is in accordance with embodiments of the present disclosure in an open or un-pressurized condition.

FIG. 5 shows the filter assembly depicted in FIG. 4A in the retracted position and depicts the same or similar elements as depicted in FIG. 4A. For example, in the retracted position, the flow of fluid 13" is halted and housing 17' is retracted from the prescreen 18' and filter material 20'. The prescreen 18' can be advanced and taken up on roll 25', as previously described, to provide a new portion of prescreen 18'. Upon advancement of the prescreen 18', housing 17' can then be advanced to the position in FIG. 4A and the filtering process can be continued by reinitiating flow of fluid 13'. In the retracted position of housing 17' shown in FIG. 5, filter material 20' may also be advanced to expose a new filter element to fluid 13'. For example, in some embodiments, a new portion of filter material 20' can be advanced in a similar manner as that associated with the prescreen 18'.

Figure 6:
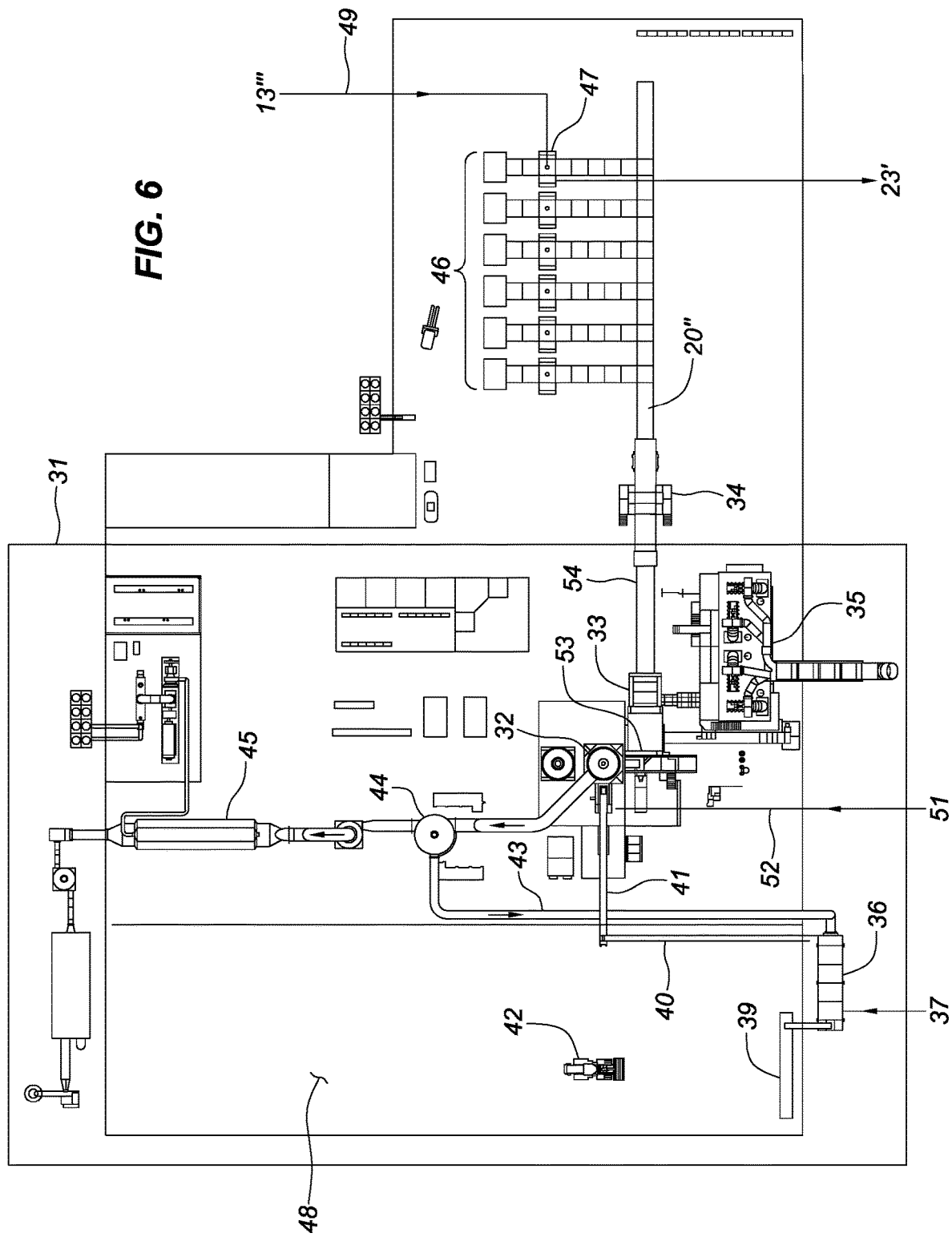
FIG. 6 depicts a complete filter plant that is in keeping with a method and apparatus that is in accordance with embodiments of the present disclosure.

FIG. 6 shows a complete filtering plant as disclosed in this method, apparatus and system. The example shown uses both a fossil fuel and electricity converted to thermal plasma to produce the heat required to melt and vitrify a feedstock for the production of a fiber filter (e.g., filter material 20"). Filter system 47, such as that described and previously denoted in FIGS. 4A to 5, is provided and can produce filtered water 23' from fluid 13'''. A tailings pond, from which fluid 13''' can be provided, as denoted in FIGS. 1, 2 and 3, has not been shown to promote drawing simplicity.

An inorganic feedstock (e.g., fiber feedstock) such as beach sand 8 in FIGS. 1, 2 and 3 and other chemical supplements such as lime sludge, which is a byproduct of oil recovery, is deposited and batched on loading floor 48. Those skilled in the art will recognize there are many accepted ways to mix or batch this feedstock queuing and loading process. A manual front end loader 42 is shown as a simple example. The fiber feedstock will many times be placed on transfer line 39 to be processed through dryer 36. The dryer 36 can typically run off waste heat from conduit 43, which is a byproduct of an afterburner 44. Combustion air 37 can be pre-heated through dryer 36 and can extract the inorganic fraction of the fiber feedstock, which can be transferred through conduits 40 and 41 and used to help generate heat in this example in plasma melter 32. Additional fuel 51, such as a fossil fuel, can be injected into plasma chamber 32 through fuel conduit 52. The exhaust gas from the melt process is post processed through conventional clean up processes before it is released to the atmosphere.

Fiber spinner 53 can be fed with the vitrified melt produced in melter 32 to produce an interwoven fiber, which can be collected in a blanket form in drum collector 33. Fiber spinner can be a spinner such as that disclosed in WO application no. 2016/164901, which is incorporated by reference as though fully set forth herein. This interwoven fiber blanket can be controlled in depth by the melting and spinning process and can be controlled in filter characteristics by the fiber length and the later fiber blanket compression in filter unit 47 (e.g., the fiber blanket compression via the housing 17 in FIGS. 4A and 5). The depth of the fiber blanket can be in a range from 5 centimeters (cm) to 30 cm and preferably from 15 cm to 20 cm. The fiber strand length in the blanket can be in a range from 0.25 cm to 3 cm, but is preferred from 1 cm to 1.75 cm. Transfer line 54 moves the fiber blanket from the drum collector and forms the blanket in a width that can be in a range from 0.6 m to 3 m and preferably in a range from 1 meter (m) to 2 m. Transfer line 54 moves the blanket to cutter station 34, which cuts the blanket to a predetermined length. The length can be in a range from 1 m to 4 m and preferably from 1 m to 2 m. The sized filter blanket proceeds to buffer line 20" and into filter stations 46. Six filter stations are shown in FIG. 6, however, any number of filter stations 46 that can be supported by the melter can be used. In some embodiments, the number of filter stations 46 can be in a range from 5 to 25 filter stations 46 and preferably from 6 to 12 filter stations 46. Fluid 13''' is transported through conduit 49 to filter systems 47 to produce recycled fluid 23, which can be repurposed in the CHWP.

Figure 7:
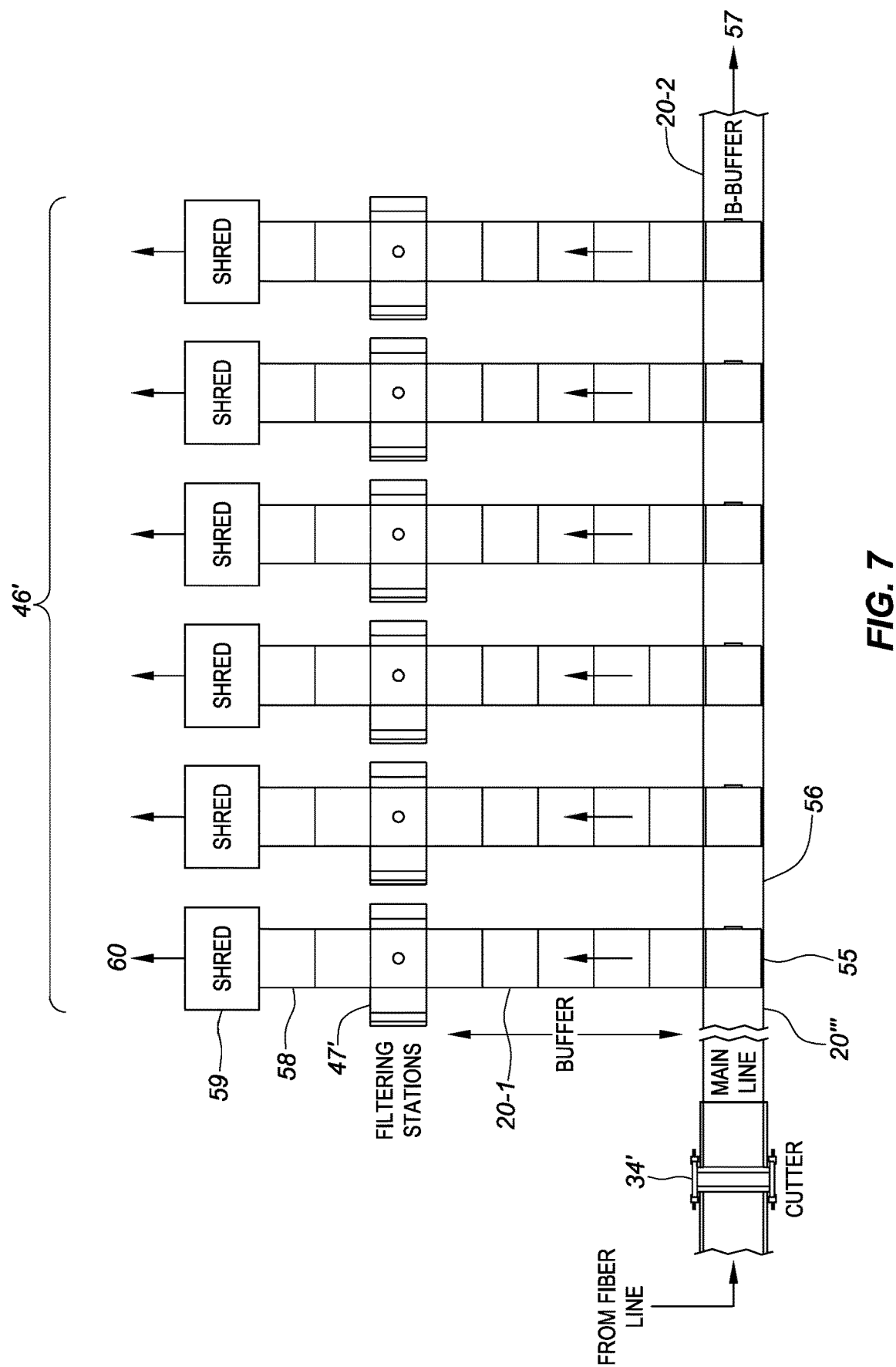
FIG. 7 depicts a detail of the filter systems and transfer lines that are in keeping with a method and apparatus that is in accordance with embodiments of the present disclosure.

FIG. 7 is a detailed image of the filtering area that includes filter stations 46 previously described herein, for example in relation to FIG. 6. The pre-sized filter blankets from cutter 34' are transferred into buffer areas 20''' via the main transfer line. Off take stations 55 can rout the filter blanket towards filter unit 47' via off take buffer area 20-1 or pass the blanket through to location 56 to have access to additional filter stations. One filter station line has been described and detailed but many can be supported by the same principals as already discussed. In an example, filter blanket can be passed through buffer area 20-2 on its way to additional filter stations and/or to storage area, for example, via buffer output 57. After the filter blanket is spent in station 47', as previously described, the blanket can be ejected to line 58 which could eject the complete filter element (not shown) or feed the element (as shown) into bulk shredder 59. Bulk shredder 59 cuts the blanket into a size that is complementary to the physical traits of the fiber which can be in a range from 2.5 cm to 13 cm pieces and preferably in a range from 5 cm to 8 cm pieces. Upon shredding, these fiber pieces which carry away the fine clays and silt from fluid 13''' in the filtering process are now able to have acceptable compaction and compressive strength and can be ejected via fiber output 60. The three-dimensional interwoven fiber acts as a binding agent for the mining waste. The filter byproduct can now be deposited in a conventional landfill to be covered with overburden or load bearing structures such as roads. The spent filters could also be recycled through the melter to manufacture new clean filter elements.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the endoscope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

I claim:

1. A filter system, comprising:
    a housing that defines a fluid inlet;
    a housing support that includes a filter support, wherein the housing and the housing support are movable with respect to one another; and
    a filter blanket wherein:
    in a first configuration, the filter blanket is compressed between the housing and the housing support, and the housing, housing support, and filter blanket are stationary with respect to one another to filter the fluid; and
    in a second configuration, the housing and the housing support are separated from one another so that the filter blanket is not compressed.

2. The filter system of claim 1, further comprising a pre-screen filter disposed over a top of the filter blanket.

3. The filter system of claim 2, wherein the housing and the housing support are configured to be separated from one another via raising or lowering either of the housing and the housing support.

4. The filter system of claim 3, wherein the housing is configured to be raised with respect to the housing support.

5. The filter system of claim 2, wherein in the second configuration the pre-screen filter is moveable with respect to the housing support.

6. The filter system of claim 5, further comprising a feed roll and a spool wherein the pre-screen filter is wound about the feed roll and fed from the feed roll to the spool, and wherein the pre-screen filter and the spool are disposed on opposite sides of the housing support.

7. The filter system of claim 6, wherein the pre-screen filter also filters the fluid and becomes a used pre-screen filter after fluid has been filtered, a and the used pre-screen filter is wound about the spool.

8. The filter system of claim 7, further comprising an air blow off to extract contaminants from the used pre-screen filter.

9. The filter system of claim 7, further comprising a scraper to extract contaminants from the used pre-screen filter.

10. The filter system of claim 1, further comprising an overflow conduit in fluid communication with an overflow basin, wherein the overflow basin is disposed beneath the filter support.

11. The filter system of claim 10, wherein the overflow conduit is in fluid communication with the fluid inlet.

12. The filter system of claim 1, further comprising a filtered fluid conduit in fluid communication with the housing support.

13. A filter system, comprising:
    a housing that defines a fluid inlet;
    a housing support that includes a filter support, wherein the housing and the housing support are movable with respect to one another;
    a pre-screen filter, moveable with respect to the housing support; and
    a filter blanket disposed between the pre-screen filter and the housing support, wherein;
    in a first configuration, the filter blanket is compressed between the pre-screen filter and the housing support to filter the fluid; and
    in a second configuration, the housing and the housing support are separated so that the pre-screen filter is moveable across an interface of the housing and the housing support.

14. The filter system of claim 13, further comprising a feed roll and a spool wherein, the pre-screen filter is wound about the feed roll and in the second configuration, the pre-screen filter is moveable across the housing support by unrolling the pre-screen filter from the feed roll and rolling the pre-screen filter onto the spool.

15. The filter system of claim 14, further comprising a scraper located between the housing support and the spool to strip contaminants from the pre-screen filter prior to rolling the pre-screen filter onto the spool.

16. The filter system of claim 15, further comprising a catch bin in which the contaminants are caught after being stripped from the pre-screen filter.

17. A filter system, comprising:
    a housing that defines a fluid inlet;
    a housing support that includes a filter support;
    a pre-screen filter, a feed roll and a spool, wherein the pre-screen filter is partly wound on the feed roll, located across an interface of the housing and the housing support and partly rolled onto the spool; and a filter blanket disposed between the pre-screen filter and the housing support, wherein:

in a first configuration, the filter blanket is compressed between the pre-screen filter and the housing support, and in a second configuration, the housing is in a raised position with respect to the housing support so that the pre-screen filter is moveable across the interface of the housing and the housing support.

18. The filter system of claim 17, wherein in the first configuration, the housing is in a lowered position with respect to the housing support to compress the filter blanket between the pre-screen filter and the housing support.

19. The filter system of claim 17, wherein the housing is configured to be lowered with respect to the housing support such that the filter blanket is compressed between the pre-screen filter and the housing support.

20. The filter system of claim 17, wherein the filter support includes a support selected from the group consisting of a bar support and a mesh support screen.

* * * * *